United States Patent
Jolley

(10) Patent No.: US 11,225,553 B1
(45) Date of Patent: Jan. 18, 2022

(54) AMINE-SUBSTITUTED PYRROLIDINE-2,5-DIONYL COPOLYMERS, POLYIMIDES, ARTICLES, AND METHODS

(71) Applicant: Essex Furukawa Magnet Wire USA LLC, Fort Wayne, IN (US)

(72) Inventor: Scott Jolley, Fort Wayne, IN (US)

(73) Assignee: Essex Furukawa Magnet Wire USA LLC, Fort Wayne, IN (US)

( * ) Notice: Subject to any disclaimer, the term of this patent is extended or adjusted under 35 U.S.C. 154(b) by 0 days.

(21) Appl. No.: 17/358,779

(22) Filed: Jun. 25, 2021

(51) Int. Cl.
   C08G 73/12   (2006.01)
   C08G 73/10   (2006.01)
   H01B 3/30    (2006.01)
   C09D 179/08  (2006.01)

(52) U.S. Cl.
   CPC ....... *C08G 73/121* (2013.01); *C08G 73/1007* (2013.01); *C09D 179/08* (2013.01); *H01B 3/305* (2013.01)

(58) Field of Classification Search
   None
   See application file for complete search history.

(56) References Cited

U.S. PATENT DOCUMENTS

| | | |
|---|---|---|
| 3,453,292 A | 7/1969 | Izumi et al. |
| 3,472,815 A | 10/1969 | Juveland |
| 3,554,984 A | 1/1971 | Norman |
| 4,066,631 A | 1/1978 | Dimmig |
| 4,142,870 A | 3/1979 | Lovejoy |
| 4,410,664 A | 10/1983 | Lee et al. |
| 4,675,350 A | 6/1987 | Marchetti et al. |
| 4,681,928 A | 7/1987 | Berger et al. |
| 4,746,718 A | 5/1988 | Gardner et al. |
| 4,771,088 A | 9/1988 | Pekarik |
| 5,109,105 A | 4/1992 | Lubowitz et al. |
| 5,112,507 A * | 5/1992 | Harrison ............ C10M 149/06 508/192 |
| 5,969,079 A | 10/1999 | Lubowitz et al. |
| 8,901,274 B2 | 12/2014 | Das et al. |
| 2004/0180797 A1* | 9/2004 | Hutter ............... C10M 159/12 508/232 |
| 2010/0312180 A1 | 12/2010 | Lorenz |
| 2010/0317554 A1* | 12/2010 | Fuchi ................. C10M 141/10 508/428 |
| 2011/0190469 A1 | 8/2011 | Rosenberg et al. |
| 2016/0096928 A1 | 4/2016 | Jeol |

FOREIGN PATENT DOCUMENTS

JP        S61195128        8/1986

OTHER PUBLICATIONS

Itenyo, M.D. et al. "Modification of Epoxy Resin with Reactive End-Capped Carboxylic Imide Oligomer for Manufacture of Glass-Fiber Reinforced Composite," Int. J. of Composite Materials 2017, 4(4): 120-126.

* cited by examiner

*Primary Examiner* — Christopher M Rodd
(74) *Attorney, Agent, or Firm* — Eversheds Sutherland (US) LLP

(57) ABSTRACT

Amine-substituted copolymers that may include an amine-substituted pyrrolidine-2,5-dione moiety. Polyamic acids and polyimides, which may be formed by contacting an amine substituted copolymer with a dianhydride, or a dianhydride and a diamine. Articles, such as wires, having a surface on which a polyimide is disposed. Methods for forming polymers.

20 Claims, 1 Drawing Sheet

AMINE-SUBSTITUTED PYRROLIDINE-2,5-DIONYL COPOLYMERS, POLYIMIDES, ARTICLES, AND METHODS

TECHNICAL FIELD

Embodiments of this disclosure relate generally to amine-substituted copolymers, including amine-substituted pyrrolidine-2,5-dionyl copolymers, polyamic acids, polyimides, methods, and articles, such as a wire, that include insulation formed from a corona resistant polyimide.

BACKGROUND

Magnet wire, also referred to as winding wire or magnetic winding wire, is utilized in a wide variety of electric machines and devices, such as inverter drive motors, motor starter generators, transformers, etc. Magnet wire typically includes polymeric enamel insulation formed around a central conductor. The enamel insulation is typically formed by applying a varnish onto the magnet wire and curing the varnish in an oven to remove solvents, thereby forming a thin enamel layer. This process is repeated until a desired enamel build or thickness has been attained.

Polymeric materials utilized to form enamel layers are intended for use under certain maximum operating temperatures. Additionally, electrical devices may be subject to relatively high voltage conditions that may break down or degrade the wire insulation. For example, an inverter may generate variable frequencies that are input into certain types of motors, and the variable frequencies may exhibit steep wave shapes that cause premature motor winding failures. As a further example, modern high voltage, high current motors, such as those used in electric automobiles, can generate strong corona fields. These strong fields can degrade wire enamels.

There remains a need for materials, including wire enamels, which perform better in strong corona fields, including materials with reduced crystallinity and/or less solution viscosity.

BRIEF SUMMARY

Provided herein are compositions that may have an improved partial discharge inception voltage (PDIV). The PDIVs of enamels described herein may be about 5% to about 10% greater than known enamels. Compositions provided herein also may be less viscous, prepared in relatively high concentrations, or a combination thereof. The compositions may include an amine-substituted copolymer that is reacted with a dianhydride to form a polyamic acid. The amine-substituted copolymer increases the "crosslinked" character of the compositions, which may increase the compositions' amorphic nature and decrease crystallinity, therefore increasing the free volume of the polymer products.

Provided herein are copolymers that may be substituted with amines, and polyamic acids or polyimides that may be formed from the copolymers. Also provided herein are methods for forming polyamic acids or polyimides, and articles having a surface on which a polyamic acid/polyimide is disposed.

In one aspect, copolymers are provided. In some embodiments, the copolymers include monomers according to formula (I), formula (II), formula (III), or formula (IV):

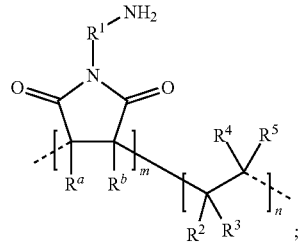

formula (I)

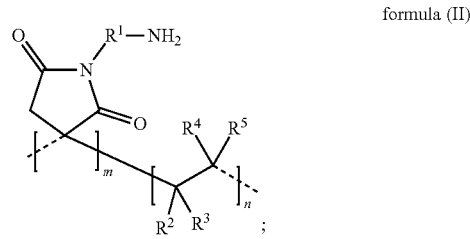

formula (II)

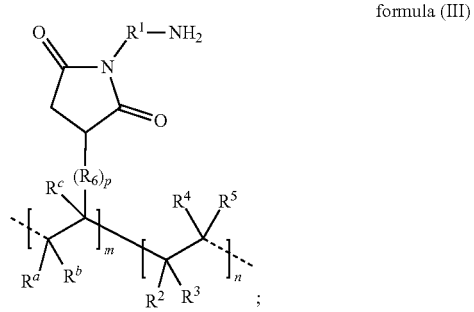

formula (III)

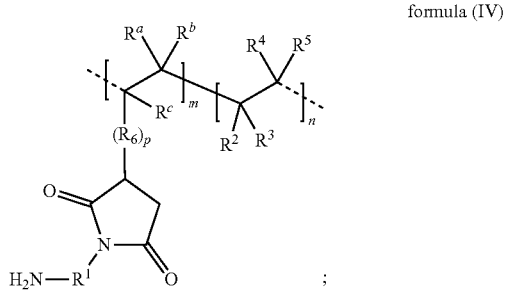

formula (IV)

wherein $R^1$ and $R^6$, independently, are a $C_1$-$C_{30}$ hydrocarbyl; $R^a$, $R^b$, $R^c$, $R^2$, $R^3$, $R^4$, and $R^5$, independently, are selected from the group consisting of hydrogen and a $C_1$-$C_{30}$ hydrocarbyl; m and n, independently, are integers from 1 to 1,000,000, 1 to 750,000, 1 to 500,000, 1 to 250,000, 1 to 100,000, or 1 to 10,000; and p is 0 or 1.

In another aspect, polyimides are provided. In some embodiments, the polyimides are of formula (V), formula (VI), formula (VII), or formula (VIII):

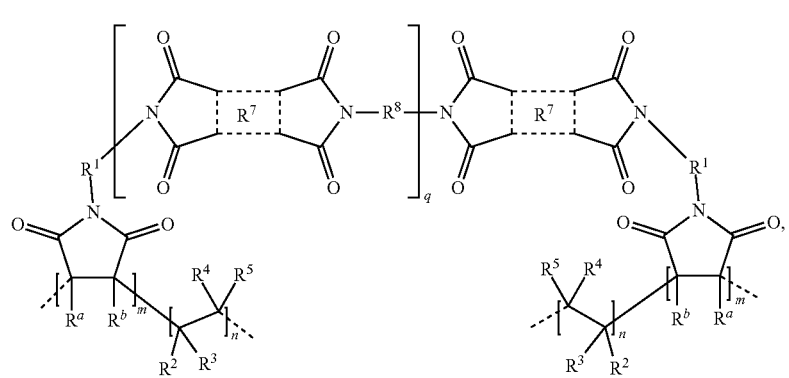
formula (V)
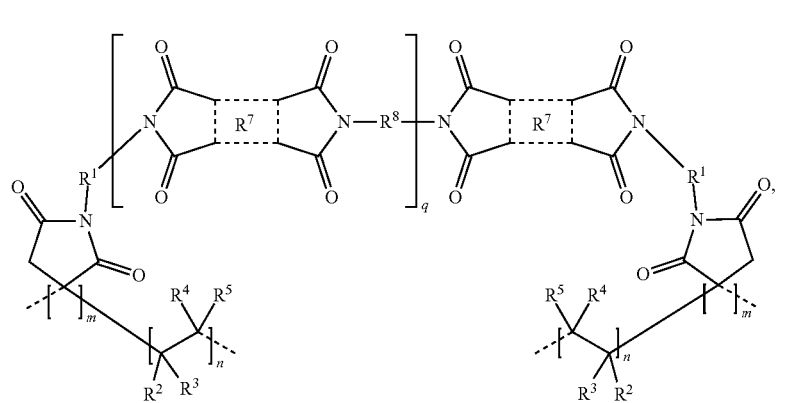
formula (VI)
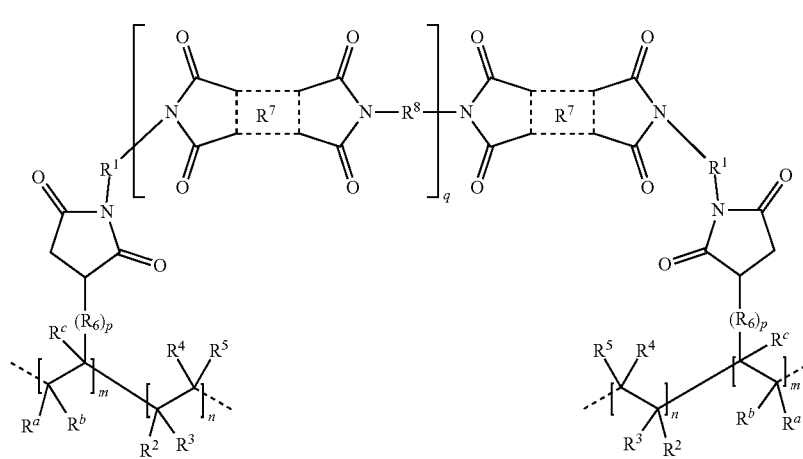
formula (VII)

-continued

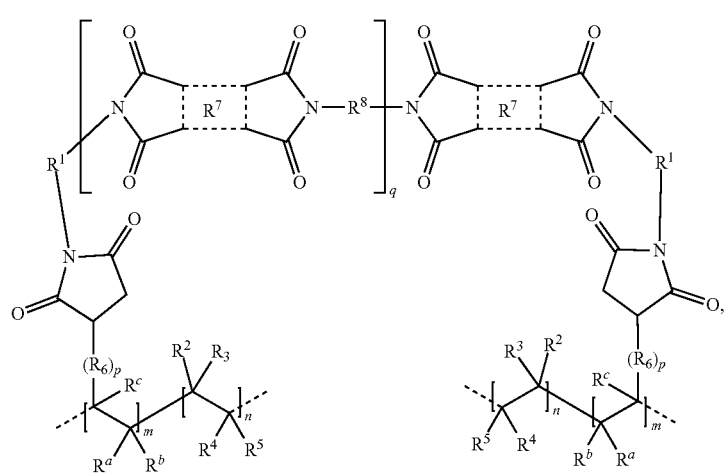

wherein $R^1$, $R^6$, and $R^8$, independently, are a $C_1$-$C_{30}$ hydrocarbyl; $R^a$, $R^b$, $R^c$, $R^2$, $R^3$, $R^4$, and $R^5$, independently, are selected from the group consisting of hydrogen and a $C_1$-$C_{30}$ hydrocarbyl; $R^7$ is a monocyclic or polycyclic $C_1$-$C_{30}$ hydrocarbyl; m and n, independently, are integers from 1 to 1,000,000, 1 to 750,000, 1 to 500,000, 1 to 250,000, 1 to 100,000, or 1 to 10,000; p is 0 or 1; and q is selected from the group consisting of 0 and an integer from 1 to 1,000,000, 1 to 750,000, 1 to 500,000, 1 to 250,000, 1 to 100,000, or 1 to 10,000.

In yet another aspect, articles, such as wires, are provided. In some embodiments, the articles, such as wires, include a conductor; and at least one layer of a polymeric enamel insulation adjacent the conductor. The polymeric enamel insulation may include a polyimide of one or more of formula (V), formula (VI), formula (VII), or formula (VIII).

In a still further aspect, methods of forming polyimides are provided. In some embodiments, the methods include providing a polymer comprising a first monomer, the first monomer comprising a 1-(amino-$C_1$-$C_{30}$ hydrocarbyl)pyrrolidinyl-2,5-dione moiety; contacting the polymer and (i) a dianhydride, or (ii) a dianhydride and a diamine to form a polyamic acid; and heating the polyamic acid at a temperature effective to form the polyimide.

Additional aspects will be set forth in part in the description which follows, and in part will be obvious from the description, or may be learned by practice of the aspects described herein. The advantages described herein may be realized and attained by means of the elements and combinations particularly pointed out in the appended claims. It is to be understood that both the foregoing general description and the following detailed description are exemplary and explanatory only and are not restrictive.

DETAILED DESCRIPTION

Figure 1A:
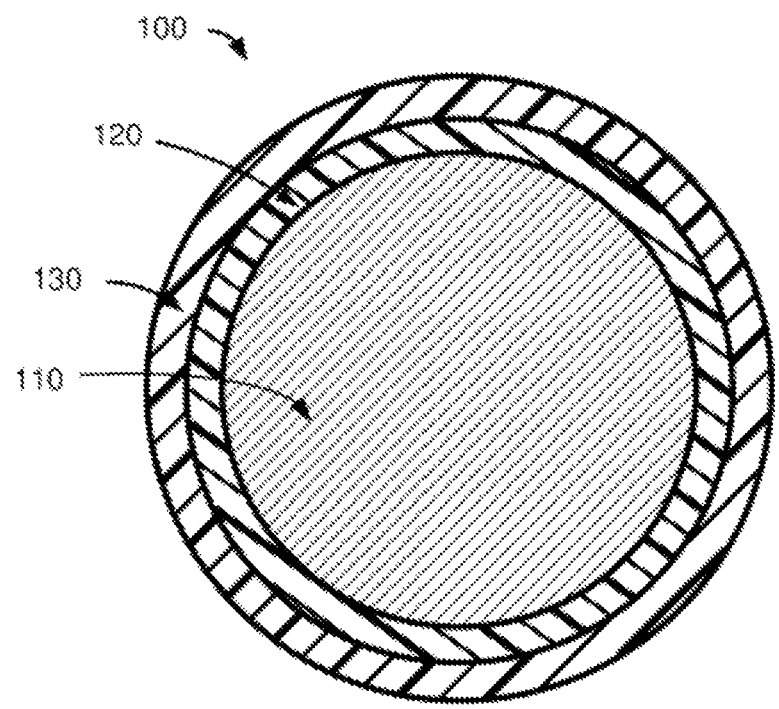
FIG. 1A depicts a cross-sectional view of an embodiment of a magnet wire that includes a surface on which a layer including a polyimide is disposed.

Provided herein are copolymers that may be amine-substituted. The amine-substituted copolymers may be used to form a polyamic acid or polyimide, as described herein.

Amine-Substituted Copolymers

Provided herein are polymers, including copolymers that may include amine-substituted copolymers. In some embodiments, the copolymers include monomers according to formula (I), formula (II), formula (III), or formula (IV):

formula (I)

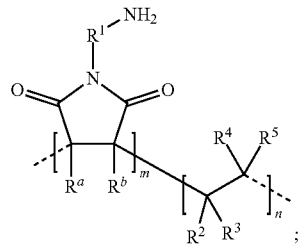

formula (II)

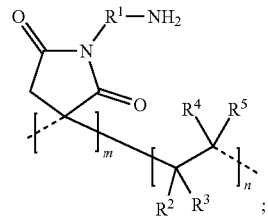

formula (III)

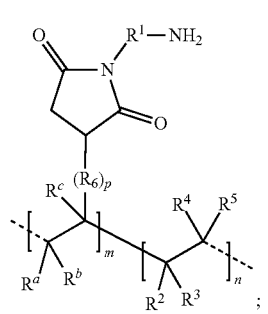

formula (IV)

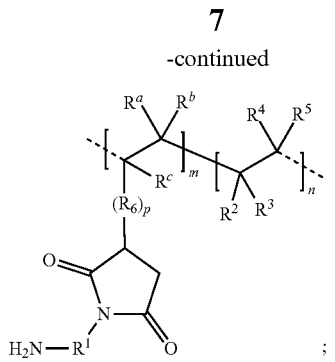

wherein $R^1$ and $R^6$, independently, are a $C_1$-$C_{30}$ hydrocarbyl; $R^a$, $R^b$, $R^c$, $R^2$, $R^3$, $R^4$, and $R^5$, independently, are selected from the group consisting of hydrogen and a $C_1$-$C_{30}$ hydrocarbyl; m and n, independently, are integers from 1 to 1,000,000, 1 to 750,000, 1 to 500,000, 1 to 250,000, 1 to 100,000, or 1 to 10,000; and p is 0 or 1. The copolymers of formula (I), formula (II), formula (III), or formula (IV) may include any end groups. The end groups may, for example, include a $C_1$-$C_{30}$ hydrocarbyl.

In some embodiments, the copolymer includes monomers of formula (I), formula (II), formula (III), or formula (IV), wherein (i) $R^3$, $R^4$, and $R^5$ are hydrogen, and $R^2$ is a $C_1$-$C_{30}$ hydrocarbyl, or (ii) $R^4$ is a $C_1$-$C_{30}$ hydrocarbyl and $R^2$, $R^3$, and $R^5$ are hydrogen. The $C_1$-$C_{30}$ hydrocarbyl, in some embodiments, is a phenyl. In some embodiments, the $C_1$-$C_{30}$ hydrocarbyl is a methoxy.

In some embodiments, the copolymer includes monomers of formula (I), formula (II), formula (III), or formula (IV), wherein (i) $R^a$ and $R^b$ are hydrogen, (ii) $R^a$ is a $C_1$-$C_{30}$ hydrocarbyl and $R^b$ is hydrogen, or (iii) $R^a$ is hydrogen and $R^b$ is a $C_1$-$C_{30}$ hydrocarbyl.

In some embodiments, $R_1$ has a structure according to any of formulas (a)-(x), including substituted derivatives thereof:

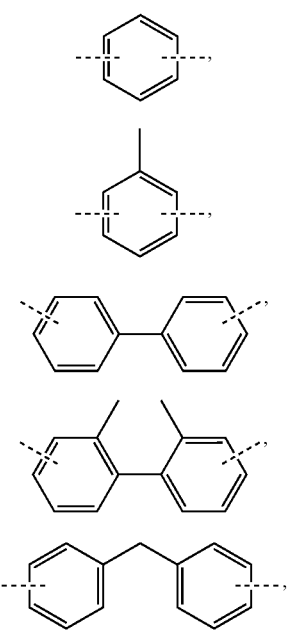

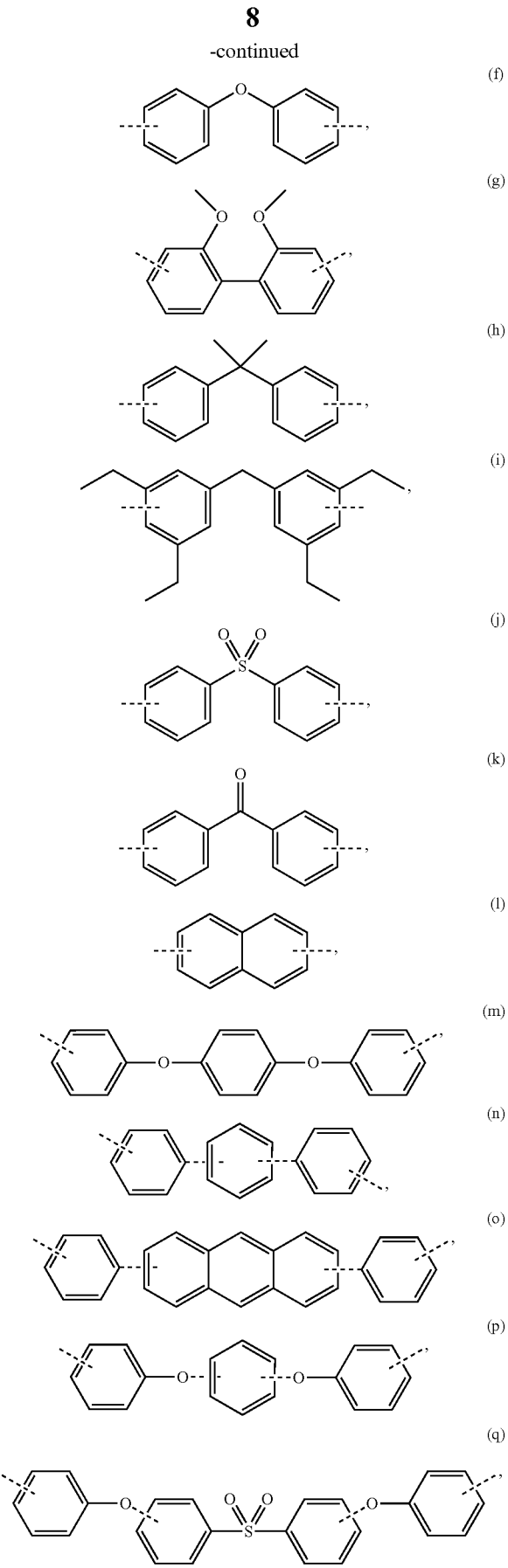

-continued
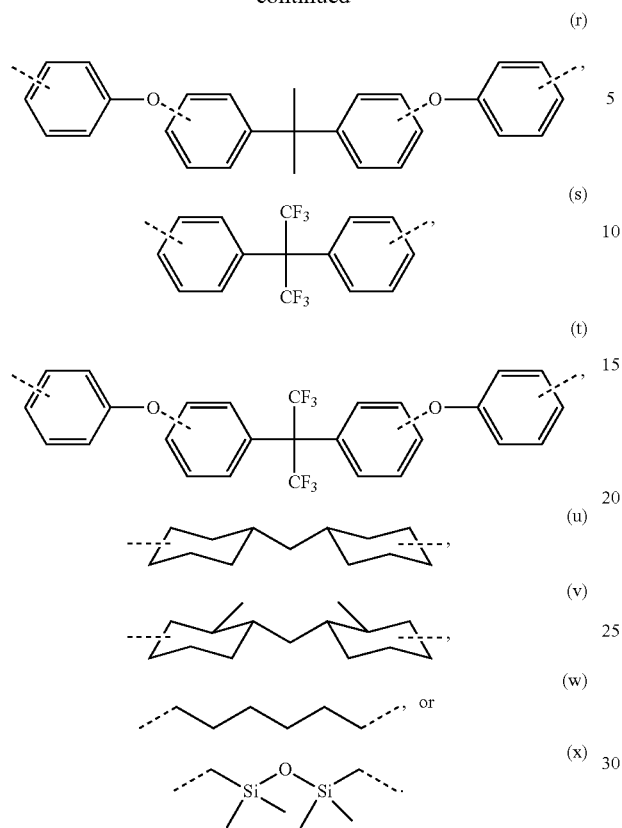
The dotted bond lines in the foregoing structures indicate a location, or possible location, of a bond between the foregoing structures and the nitrogen atoms bonded to $R^1$. $R^1$, for example, may be an unsubstituted oxy-diphenyl:
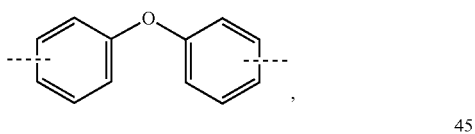
and the copolymer is of formula (Ia), formula (IIa), formula (IIIa), or formula (IVa):
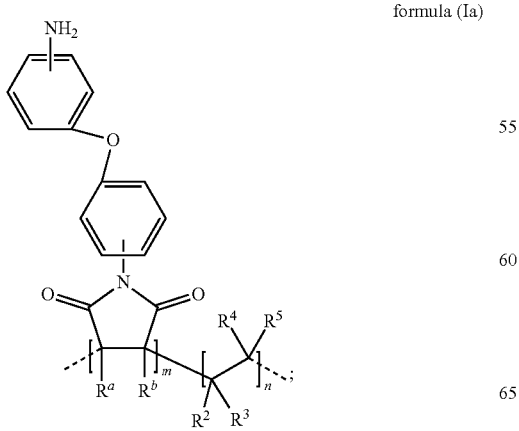
formula (Ia)
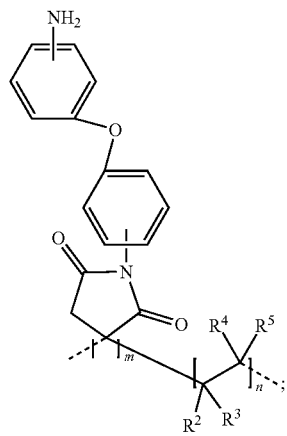
formula (IIa)
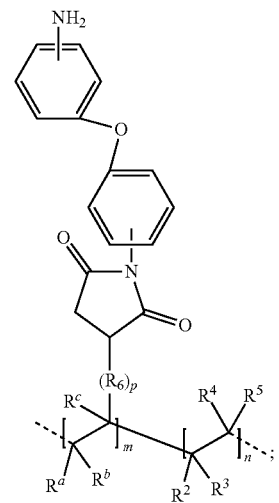
formula (IIIa)
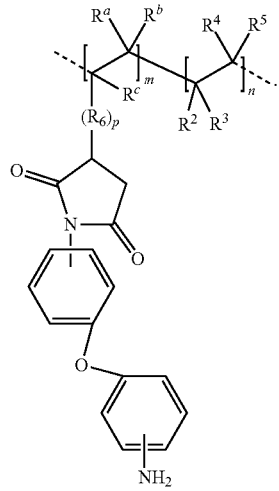
formula (IVa)

In some embodiments, R¹ is an unsubstituted oxy-diphenyl, and the copolymer is of formula (Ib), formula (IIb), formula (IIIc), or formula (IVd):
formula (Ib)
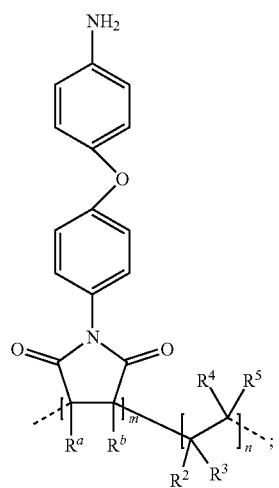
formula (IIb)
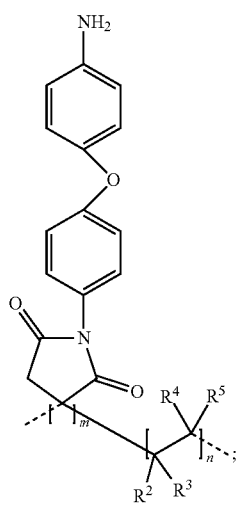
formula (IIIb)
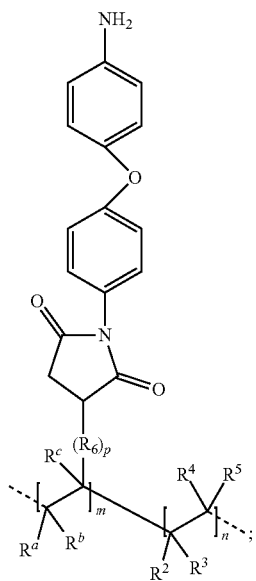
formula (IVb)
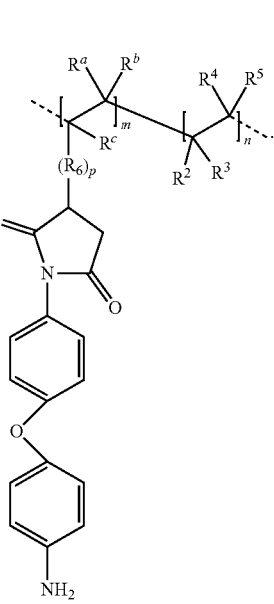
In some embodiments, the copolymer is of formula (Ib), formula (IIb), formula (IIIc), or formula (IVd), wherein p is 1, and $R^6$ is a $C_1$-$C_5$ hydrocarbyl.

Polyimide Polymers
Also provided herein are polymers, including polyamic acids and polyimides. In some embodiments, the polyimides are of formula (V), formula (VI), formula (VII), or formula (VIII):
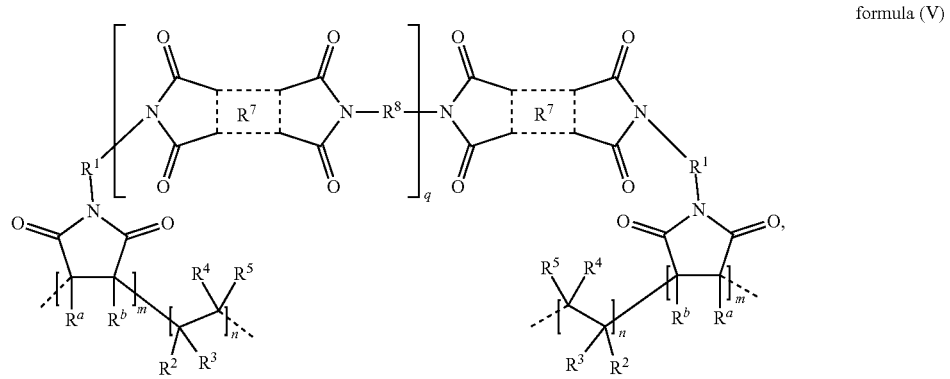
formula (V)
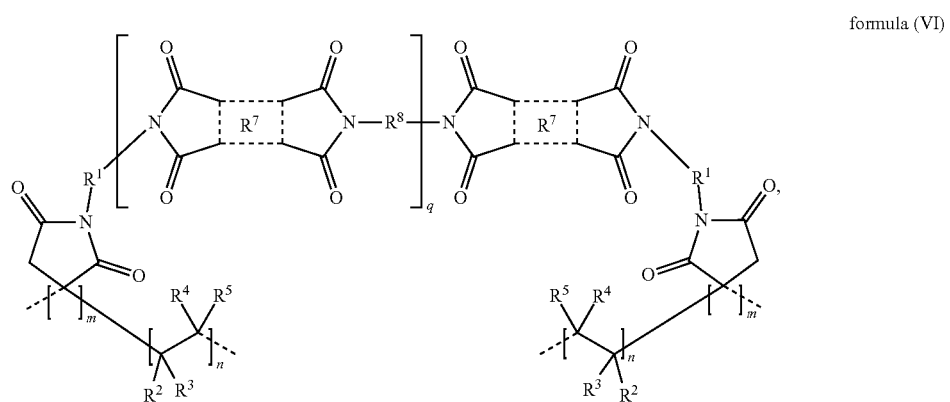
formula (VI)
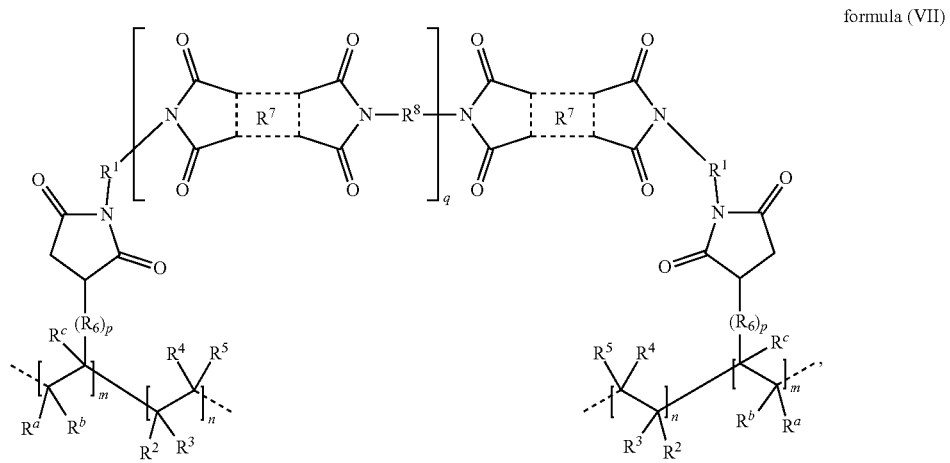
formula (VII)

-continued

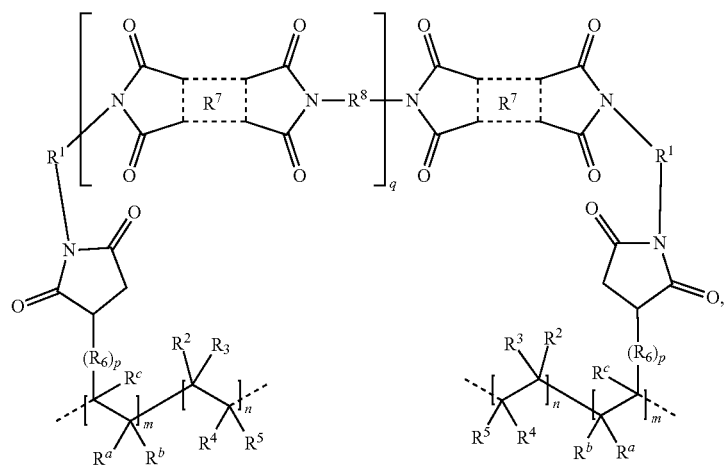

formula (VIII)

wherein $R^1$, $R^6$, and $R^8$, independently, are a $C_1$-$C_{30}$ hydrocarbyl; $R^a$, $R^b$, $R^c$, $R^2$, $R^3$, $R^4$, and $R^5$, independently, are selected from the group consisting of hydrogen and a $C_1$-$C_{30}$ hydrocarbyl; $R^7$ is a monocyclic or polycyclic $C_1$-$C_{30}$ hydrocarbyl; m and n, independently, are integers from 1 to 1,000,000, 1 to 750,000, 1 to 500,000, 1 to 250,000, 1 to 100,000, or 1 to 10,000; p is 0 or 1; and q is selected from the group consisting of 0 and an integer from 1 to 10,000. In some embodiments, q is 0.

In some embodiments, $R^7$ is an unsubstituted benzene moiety, and a monomer including $R^7$ has the following structure—

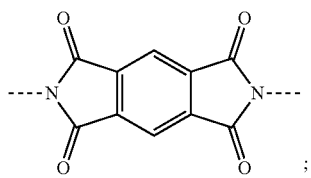

and the polyimide of formula (V) has the following structure:

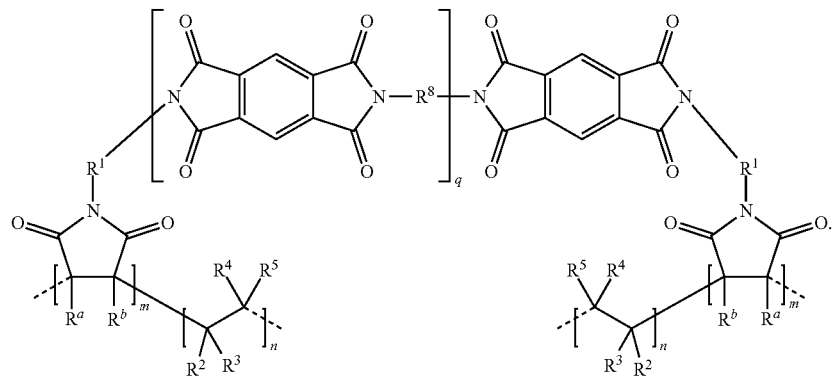

In some embodiments, $R^7$ is selected from the group consisting of (i) an unsubstituted biphenyl moiety, wherein a monomer including $R^7$ has the following structure—

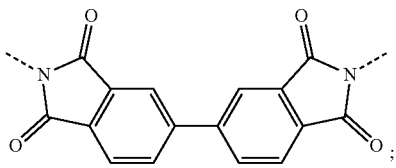

(ii) an unsubstituted benzophenonyl moiety, wherein a monomer including $R^7$ has the following structure—

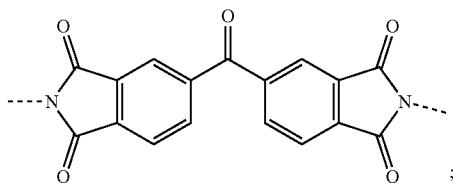

(iii) an unsubstituted oxy-diphenyl moiety, wherein a monomer including $R^7$ has the following structure—

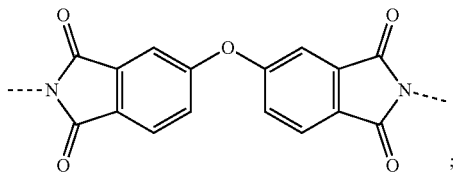

and
(iv) an unsubstituted naphthalenyl moiety, wherein a monomer including $R^7$ has the following structure—

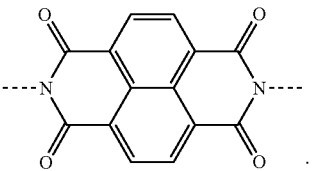

In some embodiments, the polyimide has a structure according to formula (V), formula (VI), formula (VII), or formula (VIII), wherein (i) $R^1$, (ii) $R^8$, or (iii) $R^1$ and $R^8$ is/are an unsubstituted or substituted oxy-diphenyl. In some embodiments, the polyimide has a structure according to formula (V), formula (VI), formula (VIII), or formula (VIII), wherein (i) $R^3$, $R^4$, and $R^5$ are hydrogen, and $R^2$ is an unsubstituted phenyl, (ii) $R^4$ is an unsubstituted phenyl, and $R^2$, $R^3$, and $R^5$ are hydrogen, (iii) $R^3$, $R^4$, and $R^5$ are hydrogen, and $R^2$ is a methoxy, or (iv) $R^4$ is a methoxy, and $R^2$, $R^3$, and $R^5$ are hydrogen.

Articles

Articles also provided herein, including articles having a surface on which a polymer described herein is disposed. The articles may include a conductive article, such as a wire. The wire may include a conductor; and at least one layer of a polymeric enamel insulation adjacent the conductor, wherein the polymeric enamel insulation includes a polyimide as described herein, such as a polyimide of formula (V), formula (VI), formula (VII), or formula (VIII).

In some embodiments, filler material is added to a polyimide polymer. The filler material may include a blend of at least titanium oxide ($TiO_2$) and silica oxide ($SiO_2$). A blend may additionally include other suitable materials as desired, such as chromium oxide ($CrO_2$). Filler material may be added to a polyimide at any suitable ratio. For example, in some embodiments, a total amount of filler in a filled polyimide enamel insulation layer is from about 10% to about 25%, by weight.

In some embodiments, one or more additives is added to a polyimide. The one or more additives may be used alone or in combination with a filler material. At least one additive may include an amine moiety reacted with an aldehyde. For example, a CYMEL® resin material (Allnex, GmbH, Germany) may be utilized as an additive.

FIG. 1A depicts a cross-sectional end-view of an embodiment of a round magnet wire 100, which includes a conductor 110 coated with enamel insulation. Any suitable number of enamel layers may be used. As shown at FIG. 1A, a plurality of layers of enamel insulation, including a base coat 120 and a topcoat 130, is formed around the conductor 110. In some embodiments, a single layer of enamel insulation is used. In some embodiments, more than two layers of enamel insulation are used. One or more of the enamel layers, such as the base coat 120 and/or top coat 130 of FIG. 1A, may include an inorganic filler, and the filler may include a combination of silica oxide and titanium oxide.

Figure 1B:
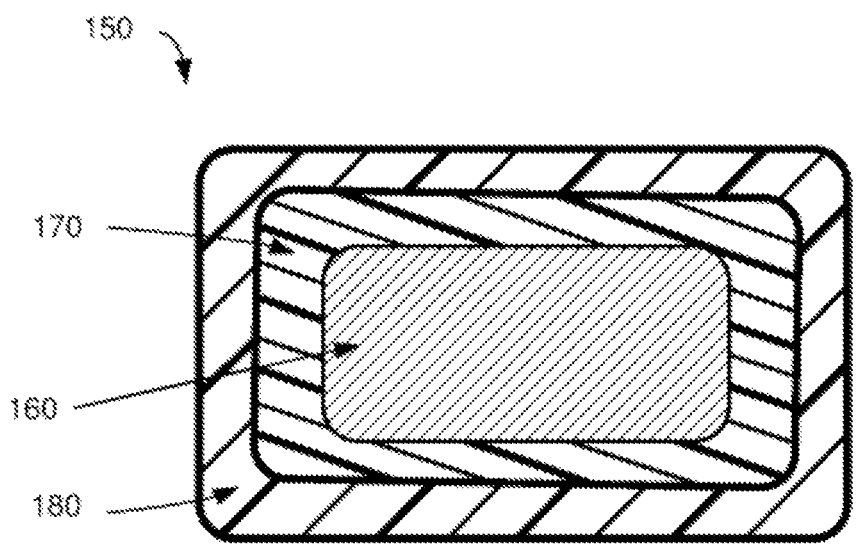
FIG. 1B depicts a cross-sectional view of an embodiment of a magnet wire that includes a surface on which a layer including a polyimide is disposed.

FIG. 1B depicts a cross-sectional end-view of an embodiment of a substantially rectangular magnet wire 150, which includes a conductor 160 coated with enamel insulation. FIG. 1B depicts a plurality of layers of enamel insulation, which includes a base coat 170 and a topcoat 180 formed around the conductor 160. In some embodiments, a single layer of enamel insulation is used. In some embodiments, more than two layers of enamel insulation are used. Further, one or more of the enamel layers may include a suitable inorganic filler, and the filler may include a combination of silica oxide and titanium oxide. The round wire 100 of FIG. 1A is described in greater detail below; however, it should be appreciated that various components of the rectangular wire 150 of FIG. 1B may be similar to those described for the round wire 100 of FIG. 1A.

The conductor 110 may be formed from a wide variety of suitable materials or combinations of materials. For example, the conductor 110 may be formed from copper, aluminum, annealed copper, oxygen-free copper, silver-plated copper, nickel plated copper, copper clad aluminum ("CCA"), silver, gold, a conductive alloy, a bimetal, or any other suitable electrically conductive material. Additionally, the conductor 110 may be formed with any suitable cross-sectional shape, such as the circular or round cross-sectional shape depicted at FIG. 1A. In some embodiments, a conductor 110 may have a rectangular (as shown, for example, at FIG. 1B), square, elliptical, oval, or any other suitable cross-sectional shape. A conductor may have corners that are rounded, sharp, smoothed, curved, angled, truncated, or otherwise formed. The conductor 110 may also be formed with any suitable dimensions, such as any suitable gauge, diameter, height, width, cross-sectional area, etc.

Any number of layers of enamel, such as the base coat 120 and topcoat 130 of FIG. 1A, may be formed around the conductor 110. An enamel layer is typically formed by applying a polymeric varnish, which may include a polyamic acid, to the conductor 110 and then baking the conductor 110 in a suitable enameling oven or furnace. The polymeric varnish typically includes a thermosetting polymeric material or resin suspended in one or more solvents. A thermosetting or thermoset polymer is a material that may be irreversibly cured from a soft solid or viscous liquid (e.g., a powder, etc.) to an insoluble or cross-linked resin. Thermosetting polymers typically cannot be melted for application via extrusion as the melting process will break down or degrade the polymer. Thus, thermosetting polymers are suspended in solvents to form a varnish that can be applied and cured to form enamel film layers. Following application of a varnish, solvent is removed as a result of baking or other suitable curing, thereby leaving a solid polymeric enamel layer. A plurality of layers of enamel may be applied to the conductor 110 in order to achieve a desired enamel thickness or build (e.g., a thickness of the enamel obtained by subtracting the thickness of the conductor and any underlying layers). Each enamel layer may be formed utilizing a similar process. In other words, a first enamel layer may be formed, for example, by applying a suitable varnish and passing the conductor through an enameling oven. A second enamel layer may subsequently be formed by applying a suitable varnish and passing the conductor through either the same enameling oven or a different enameling oven. Indeed, an enameling oven may be configured to facilitate multiple passes of a wire through the oven. As desired in various embodiments, other curing devices may be utilized in addition to or as an alternative to one or more enameling ovens. For example, one or more suitable infrared light, ultraviolet light, electron beam, and/or other curing systems may be utilized.

As desired, each layer of enamel, such as the base coat 120 and the topcoat 130, may be formed with any suitable number of sublayers. For example, the base coat 120 may include a single enamel layer or, alternatively, a plurality of enamel layers or sublayers that are formed until a desired build or thickness is achieved. Similarly, the topcoat 130 may include one or a plurality of sublayers. Each layer of enamel and/or a total enamel build may have any desired thickness, such as a thickness of approximately 0.0002, 0.0005, 0.007, 0.001, 0.002, 0.003, 0.004, 0.005, 0.006, 0.007, 0.008, 0.009, 0.010, 0.012, 0.015, 0.017, or 0.020 inches, a thickness included in a range between any two of the aforementioned values, and/or a thickness included in a range bounded on either a minimum or maximum end by one of the aforementioned values.

Methods

Also provided herein are methods of forming polyamic acids and polyimides.

In some embodiments, the methods include providing a polymer that includes a first monomer. The first monomer may include a 1-(amino-$C_1$-$C_{30}$ hydrocarbyl)pyrrolidinyl-2,5-dione moiety, which may have one of the following structures:

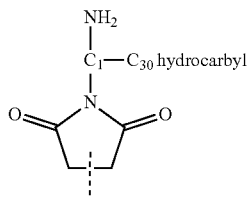 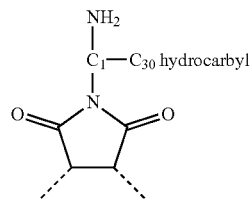

In some embodiments, the polymer that includes a first monomer is a copolymer, and the providing of the polymer includes contacting (i) an olefinic anhydride and (ii) an olefin or olefinic monomer to form a precursor polymer; and contacting the precursor polymer and a diamine to form the polymer. In some embodiments, the precursor polymer is contacted with a molar excess of the diamine. The diamine, in some embodiments, has a structure according to any of formulas (a)-(x), wherein the formula is di-amino substituted at possible locations indicated by the dotted lines.

As used herein, an "olefinic anhydride" is a compound that includes an anhydride moiety and at least one unsaturated carbon-carbon bond, such as a carbon-carbon double bond. In some embodiments, the olefinic anhydride is selected from the group consisting of maleic anhydride, citraconic anhydride, itaconic anhydride, and a compound of formula (IX):

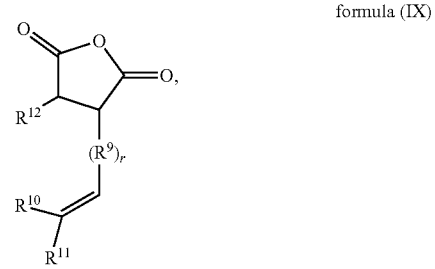

formula (IX)

wherein $R^9$ is a $C_1$-$C_{30}$ hydrocarbyl; $R^{10}$, $R^{11}$, and $R^{12}$, independently, are selected from the group consisting of hydrogen and a $C_1$-$C_{30}$ hydrocarbyl; and r is 0 or 1.

As used herein, the term "olefin" refers to an unsaturated hydrocarbon, and the term "olefinic monomer" refers to a monomer that includes at least one unsaturated carbon-carbon bond, preferably a polymerizable unsaturated carbon-carbon double bond.

In some embodiments, the methods also include contacting (i) the polymer including a 1-(amino-$C_1$-$C_{30}$ hydrocarbyl)pyrrolidinyl-2,5-dione moiety, and (ii) a dianhydride to form a polyamic acid. In some embodiments, the methods also include contacting (i) the polymer including a 1-(amino-$C_1$-$C_{30}$ hydrocarbyl)pyrrolidinyl-2,5-dione moiety, (ii) a dianhydride, and (iii) a diamine to form a polyamic acid.

In some embodiments, the dianhydride is selected from the group consisting of (i) 1H,3H-benzo[1,2-c:4,5-c']difuran-1,3,5,7-tetraone—

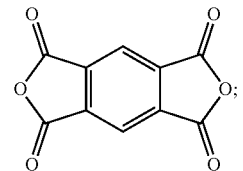 [SMILES: O=c1oc(=O)c2cc3c(=O)oc(=O)c3cc12]

(ii) [5,5'-biisobenzofuran]-1,1',3,3'-tetraone—

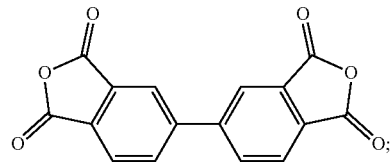 [SMILES: O=C1OC(=O)c2cc(-c3ccc4c(c3)C(=O)OC4=O)ccc21]

(iii) 5,5'-carbonylbis(isobenzofuran-1,3-dione)—

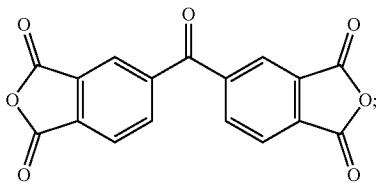 [SMILES: O=C(c1ccc2c(c1)C(=O)OC2=O)c1ccc2c(c1)C(=O)OC2=O]

(iv) 5,5'-oxybis(isobenzofuran-1,3-dione)—

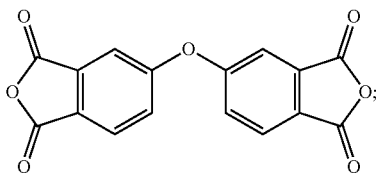 [SMILES: O=C1OC(=O)c2cc(Oc3ccc4c(c3)C(=O)OC4=O)ccc21]

and
(v) isochromeno[6,5,4-def]isochromene-1,3,6,8-tetraone—

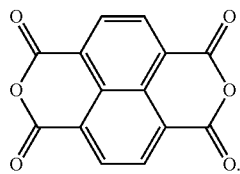 [SMILES: O=C1OC(=O)c2ccc3c4c(ccc1c24)C(=O)OC3=O]

In some embodiments, the methods also include heating the polyamic acid at a temperature effective to form the polyimide. The temperature may be at least 150° C. In some embodiments, the temperature is about 140° C. to about 200° C., about 150° C. to about 180° C., or about 150° C. to about 160° C. In some embodiments, the method includes disposing the polyamic acid on a surface of an article prior to the heating.

The various "contacting" steps of the methods described herein may occur in any suitable liquids. In some embodiments, the liquid is a polar liquid, an aprotic liquid, or a polar aprotic liquid.

The following non-limiting embodiments are provided as further examples:

Embodiment 1

A copolymer including monomers according to formula (I), formula (II), formula (III), or formula (IV) described herein, wherein $R^1$ and $R^6$, independently, are a $C_1$-$C_{30}$ hydrocarbyl; $R^a$, $R^b$, $R^c$, $R^2$, $R^3$, $R^4$, and $R^5$, independently, are selected from the group consisting of hydrogen and a $C_1$-$C_{30}$ hydrocarbyl; m and n, independently, are integers from 1 to 1,000,000, 1 to 750,000, 1 to 500,000, 1 to 250,000, 1 to 100,000, or 1 to 10,000; and p is 0 or 1.

Embodiment 2

The copolymer of Embodiment 1, wherein (i) $R^3$, $R^4$, and $R^5$ are hydrogen, and $R^2$ is a $C_1$-$C_{30}$ hydrocarbyl, or (ii) $R^4$ is a $C_1$-$C_{30}$ hydrocarbyl and $R^2$, $R^3$, and $R^5$ are hydrogen.

Embodiment 3

The copolymer of Embodiment 1 or 2, wherein, in formula (I), (i) $R^a$ and $R^b$ are hydrogen, (ii) $R^a$ is a $C_1$-$C_{30}$ hydrocarbyl and $R^b$ is hydrogen, or (iii) $R^a$ is hydrogen and $R^b$ is a $C_1$-$C_{30}$ hydrocarbyl.

Embodiment 4

The copolymer of any one of Embodiments 1 to 3, wherein $R^1$ is an unsubstituted or substituted oxy-diphenyl.

Embodiment 5

The copolymer of any one of Embodiments 1 to 4, wherein $R^1$ has a structure according to any of formulas (a)-(x) described herein.

Embodiment 6

The copolymer of any one of Embodiments 1 to 4, wherein $R^1$ is an unsubstituted oxy-diphenyl, and the copolymer is of formula (Ia), formula (IIa), formula (IIIa), or formula (IVa) described herein.

Embodiment 7

The copolymer of any one of Embodiments 1 to 6, wherein (i) $R^3$, $R^4$, and $R^5$ are hydrogen, and $R^2$ is a $C_1$-$C_{30}$ hydrocarbyl, or (ii) $R^4$ is a $C_1$-$C_{30}$ hydrocarbyl and $R^2$, $R^3$, and $R^5$ are hydrogen.

Embodiment 8

The copolymer of any one of Embodiments 1 to 7, wherein (i) $R^3$, $R^4$, and $R^5$ are hydrogen, and $R^2$ is an unsubstituted or substituted phenyl, (ii) $R^4$ is an unsubstituted or substituted phenyl, and $R^2$, $R^3$, and $R^5$ are hydrogen, (iii) $R^3$, $R^4$, and $R^5$ are hydrogen, and $R^2$ is a methoxy, or (iv) $R^4$ is a methoxy, and $R^2$, $R^3$, and $R^5$ are hydrogen.

Embodiment 9

The copolymer of any one of Embodiments 1 to 4, 7, or 8, wherein $R^1$ is an unsubstituted oxy-diphenyl, and the copolymer is of formula (Ib), formula (IIb), formula (Die), or formula (IVd) as described herein.

Embodiment 10

The copolymer of any one of Embodiments 1 to 9, wherein (i) $R^3$, $R^4$, and $R^5$ are hydrogen, and $R^2$ is an unsubstituted or substituted phenyl, (ii) $R^4$ is an unsubstituted or substituted phenyl, and $R^2$, $R^3$, and $R^5$ are hydrogen, (iii) $R^3$, $R^4$, and $R^5$ are hydrogen, and $R^2$ is a methoxy, or (iv) $R^4$ is a methoxy, and $R^2$, $R^3$, and $R^5$ are hydrogen.

Embodiment 11

The copolymer of any one of Embodiments 1 to 10, wherein p is 1, and $R^6$ is a $C_1$-$C_5$ hydrocarbyl.

Embodiment 12

A polyimide or polyamic acid including one or more copolymers of any one of Embodiments 1 to 11.

Embodiment 13

A polyimide of formula (V), formula (VI), formula (VII), or formula (VIII) as described herein, wherein $R^1$, $R^6$, and $R^8$, independently, are a $C_1$-$C_{30}$ hydrocarbyl; $R^a$, $R^b$, $R^c$, $R^2$, $R^3$, $R^4$, and $R^5$, independently, are selected from the group consisting of hydrogen and a $C_1$-$C_{30}$ hydrocarbyl; $R^7$ is a monocyclic or polycyclic $C_1$-$C_{30}$ hydrocarbyl; m and n, independently, are integers from 1 to 1,000,000, 1 to 750,000, 1 to 500,000, 1 to 250,000, 1 to 100,000, or 1 to 10,000; p is 0 or 1; and q is selected from the group consisting of 0 and an integer from 1 to 1,000,000, 1 to 750,000, 1 to 500,000, 1 to 250,000, 1 to 100,000, or 1 to 10,000.

Embodiment 14

The polyimide of Embodiment 12 or 13, wherein q is 0.

Embodiment 15

The polyimide of any one of Embodiments 12 to 14, wherein $R^7$ is selected from the group consisting of (i) an unsubstituted benzene moiety, (ii) an unsubstituted biphenyl moiety, (iii) an unsubstituted benzophenonyl moiety, (iv) an unsubstituted oxy-diphenyl moiety, and (v) an unsubstituted naphthalenyl moiety.

Embodiment 16

The polyimide of any one of Embodiments 12 to 15, wherein (i) $R^1$, (ii) $R^8$, or (iii) $R^1$ and $R^8$ is/are an unsubstituted or substituted oxy-diphenyl.

Embodiment 17

The polyimide of any one of Embodiments 12 to 16, wherein (i) $R^3$, $R^4$, and $R^5$ are hydrogen, and $R^2$ is an unsubstituted or substituted phenyl, (ii) $R^4$ is an unsubstituted or substituted phenyl, and $R^2$, $R^3$, and $R^5$ are hydrogen, (iii) $R^3$, $R^4$, and $R^5$ are hydrogen, and $R^2$ is a methoxy, or (iv) $R^4$ is a methoxy, and $R^2$, $R^3$, and $R^5$ are hydrogen.

Embodiment 18

An article having a surface on which a polyimide of any one of Embodiments 12 to 17 is disposed.

Embodiment 19

A wire including a conductor; and at least one layer of a polymeric enamel insulation adjacent the conductor, the polymeric enamel insulation including the polyimide of any one of Embodiments 12 to 17.

Embodiment 20

A method of forming a polyimide of any one of Embodiments 12 to 17.

Embodiment 21

A method of forming a polyimide, the method including providing a polymer including a first monomer, the first monomer including a 1-(amino-$C_1$-$C_{30}$ hydrocarbyl)pyrrolidinyl-2,5-dione moiety; contacting the polymer and (i) a dianhydride, or (ii) a dianhydride and a diamine to form a polyamic acid; and heating the polyamic acid at a temperature effective to form the polyimide.

Embodiment 22

The method of Embodiment 21, wherein the polymer is a copolymer, and the providing of the polymer includes contacting (i) an olefinic anhydride and (ii) an olefin or olefinic monomer to form a precursor polymer; and contacting the precursor polymer and a diamine to form the polymer.

Embodiment 23

The method of Embodiment 21 or 22, wherein the olefinic anhydride is selected from the group consisting of maleic anhydride, citraconic anhydride, itaconic anhydride, and a compound of formula (IX) as described herein, wherein $R^9$ is a $C_1$-$C_{30}$ hydrocarbyl; $R^{10}$, $R^{11}$, and $R^{12}$, independently, are selected from the group consisting of hydrogen and a $C_1$-$C_{30}$ hydrocarbyl; and r is 0 or 1.

Embodiment 24

The method of any one of Embodiments 21 to 23, wherein the dianhydride is selected from the group consisting of (i) 1H,3H-benzo[1,2-c:4,5-c']difuran-1,3,5,7-tetraone; (ii) [5,5'-biisobenzofuran]-1,1',3,3'-tetraone; (iii) 5,5'-carbonylbis(isobenzofuran-1,3-dione); (iv) 5,5'-oxybis(isobenzofuran-1,3-dione); and (v) isochromeno[6,5,4-def]isochromene-1,3,6,8-tetraone.

Embodiment 25

A polyamic acid or polyimide made according to any one of Embodiments 21 to 24.

As used herein, the term "polymer" includes any compound having a structure that includes one or more monomers, wherein the monomers are the same or different. Therefore, the term "polymer", as used herein, includes oligomers, homopolymers, and copolymers (i.e., polymers including at least two different monomers, including block copolymers, alternating copolymers, combinations thereof, etc.), and the polymers may have any structural arrangement, including, but not limited to, linear, branched, comb, star, or the like. The polymers also may be crosslinked. Therefore, formula (I), for example, reads on all of the following structures:

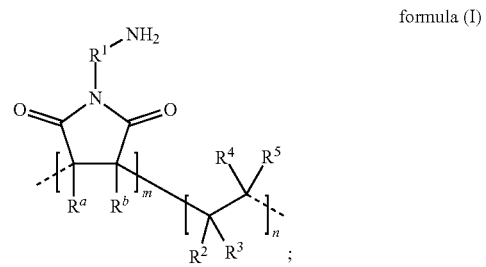

formula (I)

Monomer "A" Monomer "B"
(i) ABABABABAB, (ii) AAAAABBBBB, or (iii) AABBAABBAA, including crosslinked, branched, comb, and/or star derivatives thereof.

When used herein with regard to the selection of a substituent, the term "independently" indicates that (i) a substituent at a particular location may be the same or different for each molecule or monomer of a formula (e.g., (i) a copolymer of formula (I) may include two molecules of formula (I), with each molecule having the same or a different $C_1$-$C_{30}$ hydrocarbyl selected for $R^1$; (ii) a copolymer of formula (I) may include two monomers of formula (I), with each monomer have the same or a different $C_1$-$C_{30}$ hydrocarbyl selected for $R^1$, and/or (iii) two differently labeled substituents selected from the same pool of substituents may be the same or different (e.g., $R^1$ and $R^2$ of a molecule or monomer may both be selected from "a $C_1$-$C_{30}$ hydrocarbyl", and the $C_1$-$C_{30}$ hydrocarbyls selected for $R^1$ and $R^2$ may be the same or different)).

The phrases "$C_1$-$C_{30}$ hydrocarbyl," and the like, as used herein, generally refer to aliphatic, aryl, or arylalkyl groups containing 1 to 30 carbon atoms, including substituted derivatives thereof. Examples of aliphatic groups, in each instance, include, but are not limited to, an alkyl group, a cycloalkyl group, an alkenyl group, a cycloalkenyl group, an alkynyl group, an alkadienyl group, a cyclic group, and the like, and includes all substituted, unsubstituted, branched, and linear analogs or derivatives thereof, in each instance having 1 to 30 carbon atoms. Examples of alkyl groups include, but are not limited to, methyl, ethyl, propyl, isopropyl, n-butyl, t-butyl, isobutyl, pentyl, hexyl, isohexyl, heptyl, 4,4-dimethylpentyl, octyl, 2,2,4-trimethylpentyl, nonyl, decyl, undecyl and dodecyl. Cycloalkyl moieties may be monocyclic or multicyclic, and examples include cyclopropyl, cyclobutyl, cyclopentyl, cyclohexyl, and adamantyl. Additional examples of alkyl moieties have linear, branched and/or cyclic portions (e.g., 1-ethyl-4-methyl-cyclohexyl). Representative alkenyl moieties include vinyl, allyl, 1-butenyl, 2-butenyl, isobutylenyl, 1-pentenyl, 2-pentenyl, 3-methyl-1-butenyl, 2-methyl-2-butenyl, 2,3-dimethyl-2-butenyl, 1-hexenyl, 2-hexenyl, 3-hexenyl, 1-heptenyl, 2-heptenyl, 3-heptenyl, 1-octenyl, 2-octenyl, 3-octenyl, 1-nonenyl, 2-nonenyl, 3-nonenyl, 1-decenyl, 2-decenyl and 3-decenyl. Representative alkynyl moieties include acetylenyl, propynyl, 1-butynyl, 2-butynyl, 1-pentynyl, 2-pentynyl, 3-methyl-1-butynyl, 4-pentynyl, 1-hexynyl, 2-hexynyl, 5-hexynyl, 1-heptynyl, 2-heptynyl, 6-heptynyl, 1-octynyl, 2-octynyl, 7-octynyl, 1-nonynyl, 2-nonynyl, 8-nonynyl, 1-decynyl, 2-decynyl and 9-decynyl. Examples of aryl or arylalkyl moieties include, but are not limited to, anthracenyl, azulenyl, biphenyl, fluorenyl, indan, indenyl, naphthyl, phenanthrenyl, phenyl, 1,2,3,4-tetrahydro-naphthalene, anthracenyl, tolyl, xylyl, mesityl, benzyl, and the like, including any heteroatom substituted derivative thereof.

Unless otherwise indicated, the term "substituted," when used to describe a chemical structure or moiety, refers to a derivative of that structure or moiety wherein (i) a multivalent non-carbon atom (e.g., oxygen, nitrogen, sulfur, phosphorus, etc.) is bonded to one or more carbon atoms of the chemical structure or moiety (e.g., a "substituted" $C_4$ hydrocarbyl may include, but is not limited to, diethyl ether moiety, a methyl propionate moiety, an N,N-dimethylacetamide moiety, a butoxy moiety, etc., and a "substituted" aryl $C_{12}$ hydrocarbyl may include, but is not limited to, an oxydibenzene moiety, a benzophenone moiety, etc.) or (ii) one or more of its hydrogen atoms (e.g., chlorobenzene may be characterized generally as an aryl $C_6$ hydrocarbyl "substituted" with a chlorine atom) is substituted with a chemical moiety or functional group such as alcohol, alkoxy, alkanoyloxy, alkoxycarbonyl, alkenyl, alkyl (e.g., methyl, ethyl, propyl, t-butyl), alkynyl, alkylcarbonyloxy (—OC(O)alkyl), amide (—C(O)NH-alkyl- or -alkylNHC(O)alkyl), tertiary amine (such as alkylamino, arylamino, arylalkylamino), aryl, aryloxy, azo, carbamoyl (—NHC(O)O-alkyl- or —OC(O)NH-alkyl), carbamyl (e.g., $CONH_2$, as well as CONH-alkyl, CONH-aryl, and CONH-arylalkyl), carboxyl, carboxylic acid, cyano, ester, ether (e.g., methoxy, ethoxy), halo, haloalkyl (e.g., —$CCl_3$, —$CF_3$, —$C(CF_3)_3$), heteroalkyl, isocyanate, isothiocyanate, nitrile, nitro, oxo, phosphodiester, sulfide, sulfonamido (e.g., $SO_2NH_2$), sulfone, sulfonyl (including alkylsulfonyl, arylsulfonyl and arylalkylsulfonyl), sulfoxide, thiol (e.g., sulfhydryl, thioether) or urea (—NHCONH-alkyl-).

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of various embodiments, applicants in no way disclaim these technical aspects, and it is contemplated that the present disclosure may encompass one or more of the conventional technical aspects discussed herein.

The present disclosure may address one or more of the problems and deficiencies of known methods and processes. However, it is contemplated that various embodiments may prove useful in addressing other problems and deficiencies in a number of technical areas. Therefore, the present disclosure should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

In the descriptions provided herein, the terms "includes," "is," "containing," "having," and "comprises" are used in an open-ended fashion, and thus should be interpreted to mean "including, but not limited to." When articles, compositions of matter, or methods are claimed or described in terms of "comprising" various steps or components, the devices, systems, or methods can also "consist essentially of" or "consist of" the various steps or components, unless stated otherwise.

The terms "a," "an," and "the" are intended to include plural alternatives, e.g., at least one. For instance, the disclosure of "an olefin", "a copolymer", and the like, is meant to encompass one, or mixtures or combinations of more than one olefin, copolymer, and the like, unless otherwise specified.

Various numerical ranges may be disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. Moreover, all numerical end points of ranges disclosed herein are approximate. As a representative example, Applicant discloses, in some embodiments, that a temperature is "about 150° C. to about 160° C.". This range should be interpreted as encompassing about 150° C. and about 160° C., and further encompasses "about" each of 151° C., 152° C., 153° C., 154° C., 155° C., 156° C., 157° C., 158° C., or 159° C., including any ranges and sub-ranges between any of these values.

As used herein, the term "about" means plus or minus 10% of the numerical value of the number with which it is being used.

EXAMPLES

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims. Thus, other aspects of this invention will be apparent to those skilled in the art from consideration of the specification and practice of the invention disclosed herein.

Example 1—Synthesis of Amine-Substituted Polymer

In this example, 600 g A-methyl-2-pyrrolidone (NMP) and 200.1 g oxydianiline (ODA) were added to a 3 liter round bottom flask fitted with a $N_2$ inlet, mechanical stir shaft, and thermocouple.

This mixture was stirred and warmed to 50° C. to facilitate the dissolution of the ODA. Once dissolved, 8.1 g of styrene/maleic anhydride alternating copolymer (SMC) (about 8,000 $M_w$) were added. This solution was stirred for 30 minutes at 50° C. to produce the amine-substituted polymer of this example.

Example 2—Reaction of Amine-Substituted Polymer with Dianhydride

In this example, 700 g of NMP, 218.1 g of pyromellitic anhydride (PMDA), and 0.9 g water were mixed in a 3 liter round bottom flask. This mixture was heated to 60° C. for 45 minutes. The mixture then was cooled to 50° C.

The ODA/SMC solution of Example 1 was then added to the cooled PMDA solution in three portions. The resulting mixture was cooled to less than 70° C. after the addition of each portion in order to minimize the exotherm.

The mixture was stirred for 2 hours after all of the ODA/SMC solution of Example 1 had been added. The mixture was then filtered, which resulted in a fluid having a viscosity of 8200 cP (30° C.), and a polymer content of 22.5%.

Example 3—Synthesis of Amine-Substituted Polymer

In this example, 1600 g NMP, and 112 g (1.12 eq. amine) ODA were added to a 3 liter round bottom flask fitted with a $N_2$ inlet, mechanical stir shaft, and thermocouple. This mixture was stirred, and warmed to 50° C. to facilitate the dissolution of the ODA.

After the ODA dissolved, 3.2 g of an i-butylene/MAA alternating copolymer (0.02 eq. anhydride) (~6,000 $M_w$) was added. This mixture was stirred for 2 hours at 50° C. to facilitate the reaction. The mixture then was cooled to 23° C.

Example 4—Reaction of Amine-Substituted Polymer with Dianhydride

In this example, 119.8 g (1.10 eq. anhydride) of PMDA was added, in one portion, to the cooled solution of Example 3.

An exotherm to 46° C. was noted. The mixture was stirred for 2 hours, and then filtered to produce a liquid having a viscosity of 2000 cP (30° C.), and a polymer content of 11%.

Example 5—Synthesis of Amine-Substituted Polymer

In this example, 10.0 g (0.0515 eq.) of XIBOND® 370 styrene/maleic anhydride copolymer (~6.5 Styrene/1 MAA, 640 anhydride eq.) (PalmerHolland, USA) and 150 g of NMP were mixed in an 8 ounce glass jar. This mixture was stirred until all of the polymer prill had dissolved.

1350 g NMP and 200.1 g of ODA were mixed in a 3 liter round bottom flask fitted with a $N_2$ inlet, mechanical stir shaft, and thermocouple. This mixture was stirred and warmed to 50° C. to facilitate the dissolution of the ODA.

After dissolution of the ODA, the liquid containing XIBOND® 370 styrene/maleic anhydride was transferred to the ODA solution, and the resulting mixture was stirred at 50° C. for 30 minutes. The mixture was then cooled to 32° C.

Example 6—Reaction of Amine-Substituted Polymer with Dianhydride

In this example, 175 g PMDA was added to the cooled solution of Example 3, and the mixture was observed in order to monitor the appearance of any gel like behavior. An additional 20 g of PMDA was added, and no gel like behavior was observed. Then, an additional 10 g of PMDA was added, and gel like behavior was observed, but the gel like behavior receded as the mixture was stirred for 2 hours at 75° C. In this example, a total of 205 g PMDA was added. The enamel was filtered to produce a solution having a viscosity of 6500 cP (30° C.) and a solids content of 20%.

I claim:

1. A copolymer comprising monomers according to formula (I), formula (II), formula (III), or formula (IV):

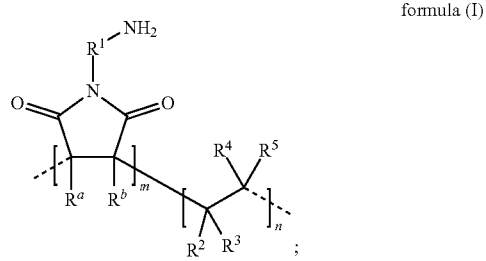

formula (I)

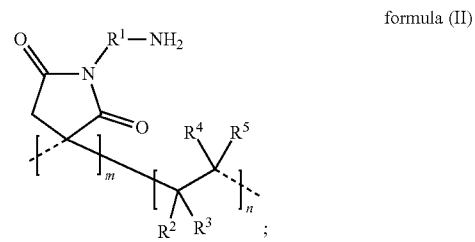

formula (II)

formula (III)

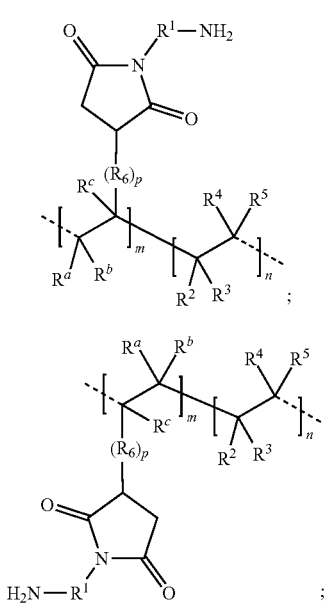

formula (IV)

wherein—

R¹ and R⁶, independently, are a $C_1$-$C_{30}$ hydrocarbyl;

$R^a$, $R^b$, $R^c$, $R^2$, $R^3$, $R^4$, and $R^5$, independently, are selected from the group consisting of hydrogen and a $C_1$-$C_{30}$ hydrocarbyl;

m and n, independently, are integers from 1 to 10,000; and p is 0 or 1.

2. The copolymer of claim 1, wherein (i) $R^3$, $R^4$, and $R^5$ are hydrogen, and $R^2$ is a $C_1$-$C_{30}$ hydrocarbyl, or (ii) $R^4$ is a $C_1$-$C_{30}$ hydrocarbyl and $R^2$, $R^3$, and $R^5$ are hydrogen.

3. The copolymer of claim 1, wherein, in formula (I), (i) $R^a$ and $R^b$ are hydrogen, (ii) $R^a$ is a $C_1$-$C_{30}$ hydrocarbyl and $R^b$ is hydrogen, or (iii) $R^a$ is hydrogen and $R^b$ is a $C_1$-$C_{30}$ hydrocarbyl.

4. The copolymer of claim 1, wherein $R^1$ is an unsubstituted or substituted oxy-diphenyl.

5. The copolymer of claim 1, wherein $R^1$ is an unsubstituted oxy-diphenyl, and the copolymer comprises monomers of formula (Ia), formula (IIa), formula (IIIa), or formula (IVa):

formula (Ia)

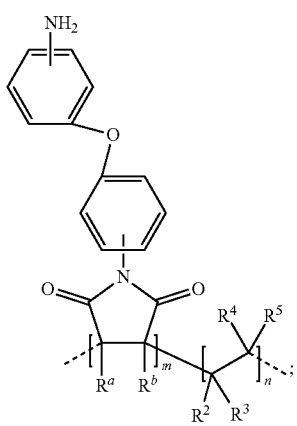

formula (IIa)

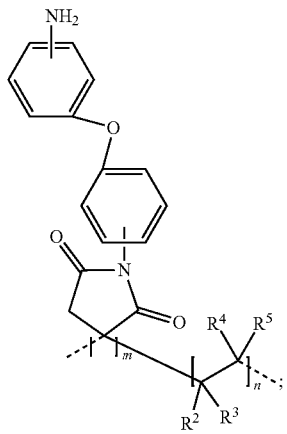

formula (IIIa)

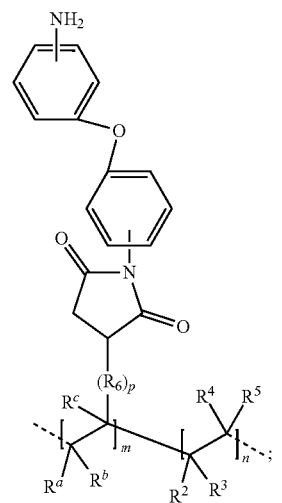

formula (IVa)

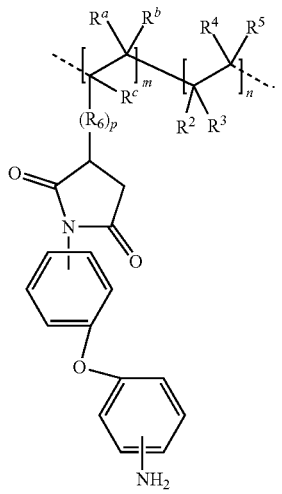

6. The copolymer of claim 5, wherein (i) $R^3$, $R^4$, and $R^5$ are hydrogen, and $R^2$ is a $C_1$-$C_{30}$ hydrocarbyl, or (ii) $R^4$ is a $C_1$-$C_{30}$ hydrocarbyl and $R^2$, $R^3$, and $R^5$ are hydrogen.

7. The copolymer of claim 5, wherein (i) $R^3$, $R^4$, and $R^5$ are hydrogen, and $R^2$ is an unsubstituted or substituted phenyl, (ii) $R^4$ is an unsubstituted or substituted phenyl, and $R^2$, $R^3$, and $R^5$ are hydrogen, (iii) $R^3$, $R^4$, and $R^5$ are hydrogen, and $R^2$ is a methoxy, or (iv) $R^4$ is a methoxy, and $R^2$, $R^3$, and $R^5$ are hydrogen.

8. The copolymer of claim 1, wherein $R^1$ is an unsubstituted oxy-diphenyl, and the copolymer comprises monomers of formula (Ib), formula (IIb), formula (IIIc), or formula (IVd):

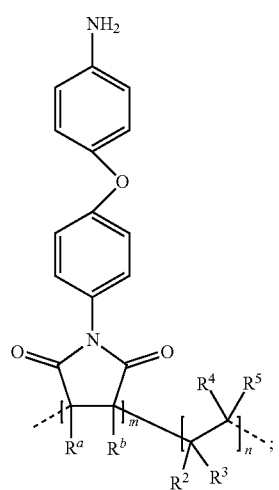

formula (Ib)

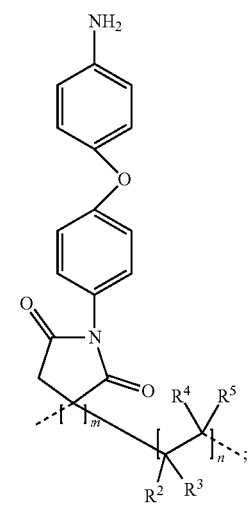

formula (IIb)

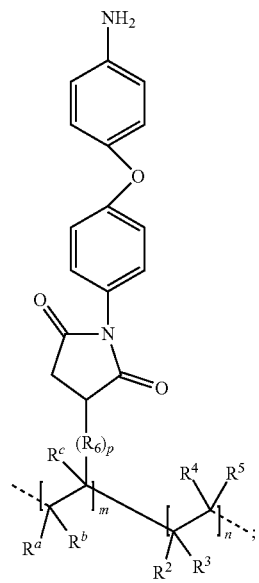

formula (IIIb)

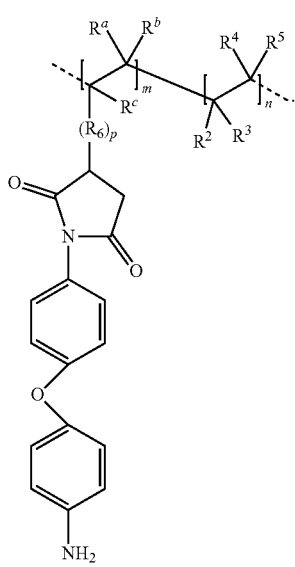

formula (IVb)

9. The copolymer of claim 8, wherein (i) $R^3$, $R^4$, and $R^5$ are hydrogen, and $R^2$ is an unsubstituted phenyl, (ii) $R^4$ is an unsubstituted phenyl, and $R^2$, $R^3$, and $R^5$ are hydrogen, (iii) $R^3$, $R^4$, and $R^5$ are hydrogen, and $R^2$ is a methoxy, or (iv) $R^4$ is a methoxy, and $R^2$, $R^3$, and $R^5$ are hydrogen.

10. The copolymer of claim 9, wherein p is 1, and $R^6$ is a $C_1$-$C_5$ hydrocarbyl.

11. A polyimide of formula (V), formula (VI), formula (VII), or formula (VIII):
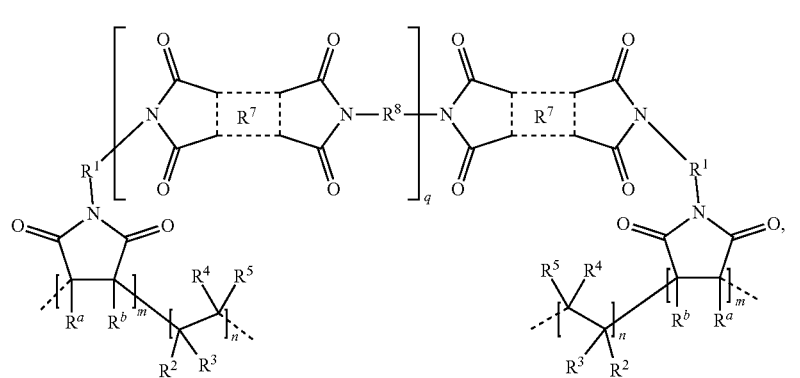
formula (V)
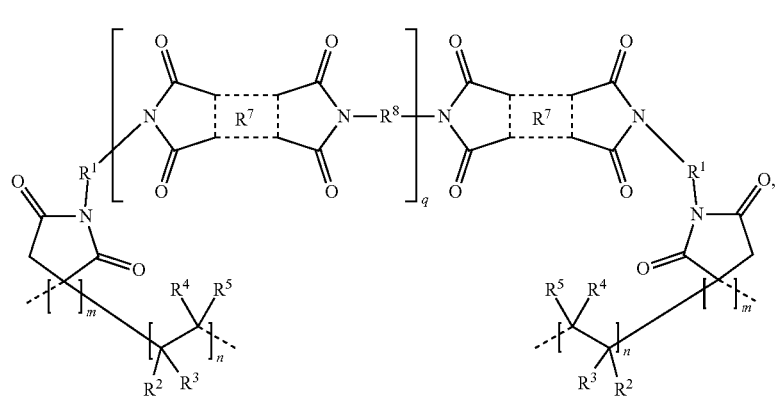
formula (VI)
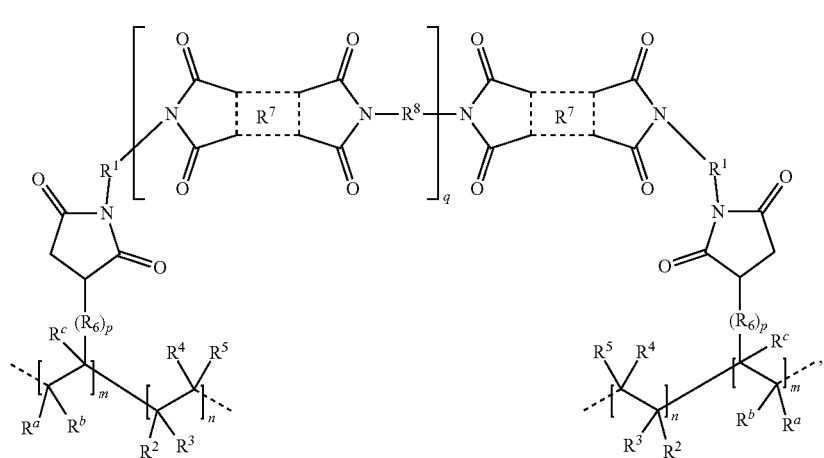
formula (VII)

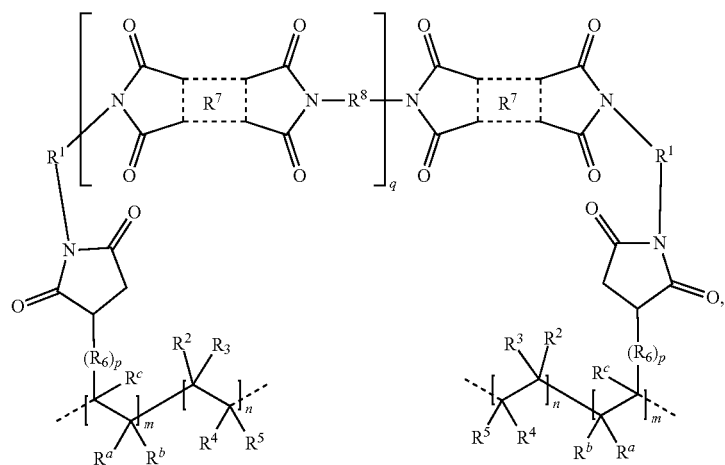

wherein—

$R^1$, $R^6$, and $R^8$, independently, are a $C_1$-$C_{30}$ hydrocarbyl;

$R^a$, $R^b$, $R^c$, $R^2$, $R^3$, $R^4$, and $R^5$, independently, are selected from the group consisting of hydrogen and a $C_1$-$C_{30}$ hydrocarbyl;

$R^7$ is a monocyclic or polycyclic $C_1$-$C_{30}$ hydrocarbyl;

m and n, independently, are integers from 1 to 10,000;

p is 0 or 1; and q is selected from the group consisting of 0 and an integer from 1 to 10,000.

12. The polyimide of claim 11, wherein q is 0.

13. The polyimide of claim 11, wherein $R^7$ is selected from the group consisting of—

(i) an unsubstituted benzene moiety, wherein a monomer comprising $R^7$ has the following structure—

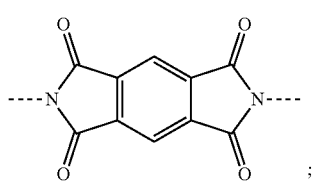

(ii) an unsubstituted biphenyl moiety, wherein a monomer comprising $R^7$ has the following structure—

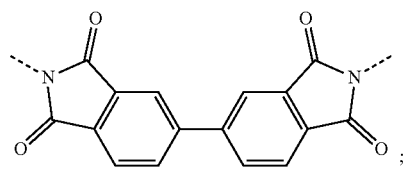

(iii) an unsubstituted benzophenonyl moiety, wherein a monomer comprising $R^7$ has the following structure—

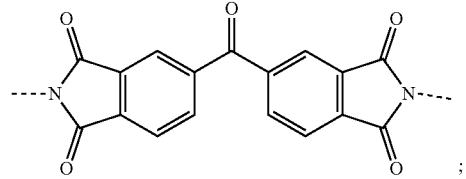

(iv) an unsubstituted oxy-diphenyl moiety, wherein a monomer comprising $R^7$ has the following structure—

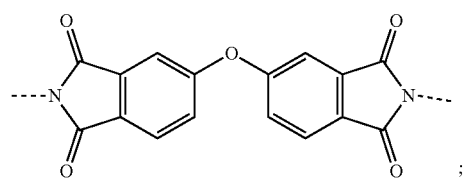

and (v) an unsubstituted naphthalenyl moiety, wherein a monomer comprising $R^7$ has the following structure—

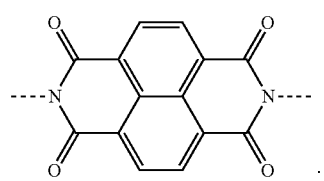

14. The polyimide of claim 11, wherein (i) $R^1$, (ii) $R^8$, or (iii) $R^1$ and $R^8$ is/are an unsubstituted or substituted oxy-diphenyl.

15. The polyimide of claim 11, wherein (i) $R^3$, $R^4$, and $R^5$ are hydrogen, and $R^2$ is an unsubstituted or substituted phenyl, (ii) $R^4$ is an unsubstituted or substituted phenyl, and $R^2$, $R^3$, and $R^5$ are hydrogen, (iii) $R^3$, $R^4$, and $R^5$ are hydrogen, and $R^2$ is a methoxy, or (iv) $R^4$ is a methoxy, and $R^2$, $R^3$, and $R^5$ are hydrogen.

16. A wire comprising:
a conductor; and
at least one layer of a polymeric enamel insulation adjacent the conductor, the polymeric enamel insulation comprising the polyimide of claim 11.

17. A method of forming a polyimide, the method comprising:
providing a polymer comprising a first monomer, the first monomer comprising a 1-(amino-$C_1$-$C_{30}$ hydrocarbyl) pyrrolidinyl-2,5-dione moiety;
contacting the polymer and (i) a dianhydride, or (ii) a dianhydride and a diamine to form a polyamic acid; and
heating the polyamic acid at a temperature effective to form the polyimide.

18. The method of claim 17, wherein the polymer is a copolymer, and the providing of the polymer comprises:
contacting (i) an olefinic anhydride and (ii) an olefin or olefinic monomer to form a precursor polymer; and
contacting the precursor polymer and a diamine to form the polymer.

19. The method of claim 18, wherein the olefinic anhydride is selected from the group consisting of maleic anhydride, citraconic anhydride, itaconic anhydride, and a compound of formula (IX):

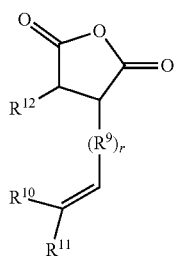

formula (IX),
wherein—
$R^9$ is a $C_1$-$C_{30}$ hydrocarbyl;
$R^{10}$, $R^{11}$, and $R^{12}$, independently, are selected from the group consisting of hydrogen and a $C_1$-$C_{30}$ hydrocarbyl; and
r is 0 or 1.

20. The method of claim 17, wherein the dianhydride is selected from the group consisting of
(i) 1H,3H-benzo[1,2-c:4,5-c']difuran-1,3,5,7-tetraone—

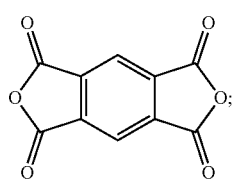 [SMILES: O=c1oc(=O)c2cc3c(=O)oc(=O)c3cc12]

(ii) [5,5'-biisobenzofuran]-1,1',3,3'-tetraone—

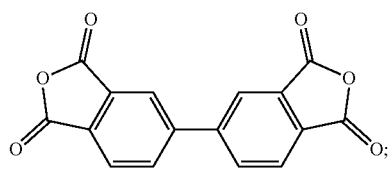

(iii) 5,5'-carbonylbis(isobenzofuran-1,3-dione)—

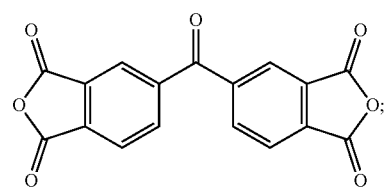 [SMILES: O=C(c1ccc2c(c1)C(=O)OC2=O)c1ccc2c(c1)C(=O)OC2=O]

(iv) 5,5'-oxybis(isobenzofuran-1,3-dione)—

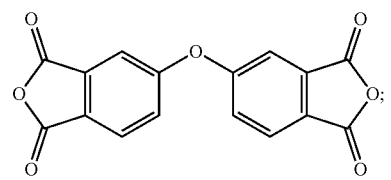 [SMILES: O=C1OC(=O)c2cc(Oc3ccc4c(c3)C(=O)OC4=O)ccc21]

and
(v) isochromeno[6,5,4-def]isochromene-1,3,6,8-tetraone—

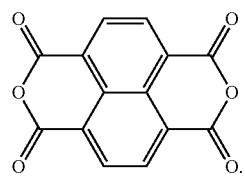 [SMILES: O=C1OC(=O)c2ccc3c4c(ccc1c24)C(=O)OC3=O]

* * * * *